3,281,482
CONVERSION OF ALKYL AROMATICS
Isaac Dvoretzky, Orinda, and Hans A. Benesi, Berkeley, Calif., assignors to Shell Oil Company, New York, N.Y., a corporation of Delaware
No Drawing. Filed Oct. 25, 1963, Ser. No. 318,797
9 Claims. (Cl. 260—668)

This invention relates to a process for the catalytic conversion of alkyl aromatic hydrocarbons and relates more particularly to a process for the isomerization of xylenes.

The catalytic isomerization of xylenes and similar low molecular weight alkyl benzenes is known. For example, aluminum chloride promoted with hydrogen chloride was a very early catalyst suggested for this isomerization reaction. Subsequently, the amorphous silica-alumina hydrocarbon cracking catalysts and especially such catalysts having incorporated therewith nickel or platinum, were suggested for this isomerization reaction. In general, the previously suggested catalysts have a disadvantage such as one or more of the following: (1) the catalyst is expensive, (2) the catalyst is insufficiently active for the isomerization reaction to be used in a commercial process, (3) the catalyst is sufficiently active but ultimate life is too short to be of commercial interest, or (4) the catalyst has poor selectivity for the isomerization reaction, i.e. the catalyst promotes side reactions such as cracking and hydrogenation which reduces the yield of isomerized aromatics.

It has now been found that xylenes can be isomerized at an elevated temperature by means of a crystalline hydrogen alumino-silicate of the zeolite type. In accordance with one embodiment of the process of the invention, xylene is contacted with a catalyst comprising a hydrogen form of a crystalline alumino-silicate known as hydrogen mordenite in the presence of hydrogen at a temperature in the range from about 400° to about 900° F. A particularly active catalyst comprises a hydrogen form of crystalline alumino-silicate having incorporated therewith a metal, especially silver, to improve activity, selectivity and/or stability.

Zeolites are porous crystalline alumino-silicates and are well known in the art. Naturally occurring zeolites are, for example, chabazite, gmelinite, erionite, and faujasite. Zeolites have rigid three-dimensional anionic networks with intracrystalline channels whose narrowest cross section has essentially a uniform diameter. Zeolites are to be distinguished over crystalline aluminosilicate clays such as bentonite, which have a two-dimensional layer structure, and over amorphous aluminosilicates such as synthetic silica-alumina cracking catalyst, which have a random structure. Synthetic zeolites, designated as Type X and Type A molecular sieves, are commercially available from Linde Company.

The zeolites are composed of alkali or alkaline earth metal oxides, alumina and silica in various proportions. In the case of a given zeolite, the intracrystalline channels, generally designated as pores, can be varied in size to a certain extent by replacing all or part of the exchangeable cations with other suitable ions by ion-exchange. The zeolites are used for drying and for separating certain hydrocarbon types, and even have been proposed as catalyst for such hydrocarbon conversion reactions as cracking. In general, however, cracking activity of the zeolites is less than that of the conventional amorphous silica-alumina cracking catalyst.

A catalyst employed in the process of this invention is a particular form of zeolite known as mordenite. While mordenite is naturally occurring, a synthetic mordenite known as Zeolon has become available commercially from the Norton Company. Mordenite is characterized by its high silicon to aluminum ratio of about 5:1 and its crystal structure. Composition of mordenite as given in Kirk-Othmer "Encyclopedia of Chemical Technology," vol. 12, page 297, is $(Ca, Na_2) Al_2Si_9O_{22}6H_2O$. The proposed structure is one in which the basic building block is a tetrahedron consisting of one silicon or aluminum atom surrounded by four oxygen atoms. The crystal is made up of chains of four-and-five-membered rings of these tetrahedra. These four-and-five-membered rings are believed to give the structure its stability. The chains are linked together to form a network having a system of large parallel channels interconnected by small cross channels. Rings of 12 tetrahedra form the large channels. Other synthetic zeolites also have such 12-membered rings but they have interconnected cages whereas the mordenite has parallel channels of uniform diameter. For example, synthetic faujasite, which has the formula $Na_3Al_3Si_4O_{14}$, is characterized by a three-dimensional array of pores which consist of 12–13 A. cages interconnected through 8–9 A. windows.

For use as a catalyst in the process of the invention, the sodium form of mordenite is converted to the hydrogen form, which is often referred to as the acid form. Conversion of the sodium form to the hydrogen form is achieved either by the direct replacement of sodium ions with hydrogen ions or by replacement of sodium ions with ammonium ions followed by decomposition of the ammonium form by calcination. At least about 95%, and preferably at least about 99%, of the alkali metal is removed by the ion-exchange. Chemical analysis of the calcined product of the ammonium form of mordenite shows that complete decomposition of the ammonium ion has occurred, yet the X-ray pattern of the product is the same as that of the original ammonium form. Thus, no attack on the crystalline alumino-silicate lattice is detected.

On the other hand, calcination of the ammonium form of other zeolites such as erionite and faujasite destroys the crystalline alumino-silicate lattice. For example, a naturally occurring zeolite known as erionite which has the approximate formula $M_2Al_2Si_7O_{18}$, where M represents exchangeable alkaline and alkaline earth metal ions, can be converted to the ammonium form by extensive washing with ammonium nitrate solution. X-ray diffraction films of the product before and after calcination in air at 500° C. indicate that much of the crystalline alumino-silicate lattice is destroyed during calcination to form amorphous material. Similarly, a synthetic faujasite denoted as 13X by the manufacturer, Linde Company, and having the formula $Na_3Al_3Si_4O_{14}$, can be converted to the ammonium form. X-ray examination of the decomposition product of the ammonium form of this faujasite shows that extensive destruction of the lattice occurs in this case, also. Again amorphous material is formed.

The hydrogen form of mordenite is an active and selective catalyst for the isomerization of xylenes. Other acidic solids such as silica-alumina cracking catalyst with or without platinum or nickel, have little activity or poor selectivity for the isomerization of such alkylated benzeness under similar conditions.

Feed to the process of the invention can be a substantially pure xylene isomer, a mixture of xylene isomers, or hydrocarbon fractions rich in xylene isomers. For example, a source of xylene isomers is the $C_8$ aromatic fraction recovered from catalytic reformates or coal tars. The xylene fraction remaining after separating and recovering all or a part of a given isomer from such a source is a suitable feed for the process of the invention. Thus, para-xylene, which is of growing importance, can be recovered from a $C_8$ catalytic reformate fraction by low temperature crystallization. The mother liquor produced from such low temperature crystallization is deficient in para-xylene with respect to the thermodynamic equilibrium concentration of xylene isomers and is an excellent feed to the present process.

The process of the invention is carried out at a temperature in the range from about 400° to 900° F. and preferably from about 550° to 750° F. In general, higher conversions are obtained as temperature is increased.

The isomerization reaction can be conducted over a wide range of space velocities, such as a space velocity in the range from about 0.5 to 25, but is preferably at a space velocity in the range from about 1 to 10. In general, conversion decreases with an increase in space velocity, although selectivity is generally increased. Space velocity, as the term is used herein, refers to WHSV and is expressed as weight of feed, per hour, per unit weight of catalyst.

The isomerization reaction is carried out in the presence of hydrogen, however, there is little or no net consumption of hydrogen in the process. Any consumption of hydrogen is the result of side reactions, such as hydrogenation of the aromatics and it is preferred to keep such reactions to a minimum. The presence of hydrogen functions to improve catalyst life, apparently by preventing polymerization of intermediate reaction products which would otherwise polymerize and deposit on the catalyst, and apparently also, functions to improve conversion and selectivity for the isomerization reaction. A hydrogen to hydrocarbon mole ratio of from about 1:1 to 25:1 and preferably from about 5:1 to 15:1 is used. It is not necessary to employ pure hydrogen, since hydrogen-containing gases, e.g. hydrogen-rich gas from the catalytic reforming of naphthas, are suitable. Total pressure is in the range from about 100 to 1500 pounds per square inch gauge (p.s.i.g.) and preferably from about 500 to 1000 p.s.i.g.

It is often advantageous to incorporate into the mordenite catalytic metals or other promoters which enhance catalytic activity, selectivity and/or stability. This can be done, for example, by contacting the ammonium form of mordenite with a solution of a salt of the particular metal desired. When the metal is in the form of a cation, the metal will be incorporated into the mordenite by ion exchange. All or a part of the ammonium ions can be replaced by the metal cations. Where the metal is in the form of an anion, the metal is impregnated onto the catalyst. After the metal has been incorporated into the ammonium form of mordenite, the catalyst is dried and calcined. Metals can be incorporated directly into the hydrogen form of mordenite by impregnation with a metal salt solution.

Metal which can be suitably added to mordenite by ion exchange or impregnation methods are those having hydrogenation-dehydrogenation activity and includes the transitional metals. Metals of Group IB such as copper and including silver, Group VIB (chromium, molybdenum and tungsten) and Group VIII, particularly the iron group, are preferred. In addition to hydrogen, a wide range of cations such as, for example, the metals of Cr, Mn, Fe, Co, Ni, Cu, Ag, Zn and Cd can be exchanged in the mordenite structure. With metals which have a strong hydrogenation activity such as an impregnated nickel, it is preferred to sulfide the catalyst to convert the nickel to nickel sulfide, which is a less active hydrogenation component, to improve selectivity. The incorporation of silver into hydrogen mordenite provides an especially active and selective isomerization catalyst. When catalytic metals are incorporated into the mordenite isomerization catalyst, from about 0.1% to about 20% and preferably 0.1% to 10% by weight (calculated as the metal) is used.

In the present process, as in any known xylene isomerization process, the reaction zone effluent contains a mixture of the three xylene isomers even when the feed is a single isomer or a mixture of two isomers. To obtain a specific xylene isomer, the isomerization product is recovered and subjected to a suitable separation such as the use of low temperature crystallization, the use of complexing agents, and the like. Such separation processes are well known and as they are not a part of the isomerization process of this invention, a description of separation methods is unnecessary.

EXAMPLE I

A hydrogen form of mordenite was prepared by converting Na-Zeolon, a sodium form of synthetic mordenite manufactured by Norton Company, into the ammonium form by ion exchange with ammonium nitrate followed by calcination at 1022° F. (550° C.) for 16 hours. The hydrogen mordenite contained only about 0.01% by weight sodium.

The hydrogen mordenite was compared with an amorphous silica-alumina (American Cyanamid MSA-3 cracking catalyst containing about 25% w. alumina, 75% w. silica) and halogenated alumina for the isomerization of ortho-xylene at 572° F. (300° C.) 1000 p.s.i.g., and 26:1 hydrogen to hydrocarbon molar ratio. Results are given below in Table I. Data are included for nickel ion exchanged into ammonium mordenite prior to calcination as well as nickel and platinum on fluorided silica-alumina, the metals being incorporated thereon by impregnation.

TABLE I

| Catalyst No. | Catalyst | WHSV | Conversion, percent w. | Selectivity to m- and p-xylene, percent w. |
|---|---|---|---|---|
| 1 | Hydrogen mordenite | 20 | 6.3 | 73 |
| 2 | 2.3% w. Ni/Hydrogen mordenite | 20 | 8.3 | 59 |
| 3 | Silica-alumina | 20 | 1.1 | 70 |
| 4 | 5.0% w. Ni/0.2% w. F/silica-alumina | 8 | 100 | 0 |
| 5 | 0.4% w. Pt/0.3% w. F/silica-alumina | 8 | 100 | 0 |
| 6 | 2.5% w. F/alumina | 4 | 0 | |
| 7 | 10.1% w. Cl/alumina | 8 | 1.3 | 15 |

From the above results it can be seen that hydrogen mordenite is appreciably more active than amorphous silica-alumina. Nickel incorporated into hydrogen mordenite increases activity but at some loss in selectivity. Nickel or platinum, which have strong hydrogenation activity, on the fluorided silica-alumina is not selective at these conditions since the o-xylene is completely hydrogenated rather than isomerized. It should be noted, that platinum on silica-alumina, which has been proposed for the isomerization xylenes, is generally employed at relatively high temperatures and low pressures, e.g., about 450° C. and 150–350 p.s.i., which favors a low equilibrium concentration of naphthenes. However, disproportionation and cracking then occurs to a large extent. The halogenated alumina catalysts have little activity or selectivity.

EXAMPLE II

The high activity and selectivity of silver incorporated into mordenite is demonstrated in this example. Silver mordenite (4.7% w. Ag) was prepared in the manner described for nickel mordenite in Example I, i.e., by ion-exchanging silver cations into ammonium mordenite. Isomerization tests were conducted with o-xylene at 572° F., 1000 p.s.i.g., and a hydrogen to hydrocarbon molar ratio of 26:1. Results are given in Table 2.

TABLE 2

| WHSV | Conversion, percent w. | Selectivity to m- and p-xylenes, percent w. |
|---|---|---|
| 2 | 59.9 | 72 |
| 8 | 40.2 | 91 |
| 20 | 25.3 | 91 |

We claim as our invention:

1. A process for isomerizing a xylene isomer which comprises contacting said xylene isomer in a reaction zone at an elevated temperature of about 400° to 900° F. with a catalyst comprising a crystalline hydrogen alumino-silicate, and recovering from the reaction zone effluent a mixture of three xylene isomers.

2. A process for isomerizing a xylene isomer which comprises contacting said xylene isomer in a reaction zone at a temperature of about 400° to 900° F. with hydrogen mordenite, and recovering from the reaction zone effluent a mixture of three xylene isomers.

3. A process for isomerizing a xylene isomer which comprises contacting said xylene isomer in a reaction zone at an elevated temperature of about 400° to 900° F. with a crystalline hydrogen alumino-silicate having incorporated therewith a hydrogenation-dehydrogenation component, and recovering from the reaction zone effluent a mixture of three xylene isomers.

4. A process for isomerizing a xylene isomer which comprises contacting said xylene isomer in a reaction zone at an elevated temperature of about 400° to 900° F. with a crystalline hydrogen alumino-silicate having silver incorporated therewith, and recovering from the reaction zone effluent a mixture of three xylene isomers.

5. A process for isomerizing a xylene isomer which comprises contacting said xylene isomer in a reaction zone at a temperature in the range from about 550° to 750° F., a pressure of about 500 to 1000 p.s.i.g. and a hydrogen to oil mol ratio of about 1:1 to 20:1 with hydrogen mordenite having silver incorporated therewith, and recovering from the reaction zone effluent a mixture of three xylene isomers.

6. A process for isomerizing a xylene isomer which comprises contacting said xylene isomer in a reaction zone at a temperature in the range from about 400° to 900° F., a pressure in the range from about 500 to 1000 p.s.i.g., and a hydrogen to oil mol ratio of about 1:1 to 20:1 with a crystalline hydrogen alumino-silicate, and recovering from the reaction zone effluent a mixture of three xylene isomers.

7. A process for isomerizing a xylene isomer which comprises contacting said xylene isomer in a reaction zone at a temperature in the range from about 400° to 900° F., a pressure in the range from about 500 to 1000 p.s.i.g., and a hydrogen to oil mol ratio of about 1:1 to 20:1 with a crystalline hydrogen alumino-silicate having silver incorporated therewith, and recovering from the reaction zone effluent a mixture of three xylene isomers.

8. A process for isomerizing a xylene isomer which comprises contacting said xylene isomer in a reaction zone at a temperature in the range from about 400° to 900° F., a pressure in the range from about 500 to 1000 p.s.i.g., and a hydrogen to oil mol ratio of about 1:1 to 20:1 with hydrogen mordenite, and recovering from the reaction zone effluent a mixture of three xylene isomers.

9. A process for isomerizing a xylene isomer which comprises contacting said xylene isomer in a reaction zone at a temperature in the range from about 400° to 900° F., a pressure in the range from about 500 to 1000 p.s.i.g., and a hydrogen to oil mol ratio of about 1:1 to 20:1 with hydrogen mordenite having incorporated therewith a hydrogenation-dehydrogenation component, and recovering from the reaction zone effluent a mixture of three xylene isomers.

References Cited by the Examiner
UNITED STATES PATENTS

| | | | |
|---|---|---|---|
| 3,140,251 | 7/1964 | Plank et al. | 208—120 |
| 3,140,253 | 7/1964 | Plank et al. | 208—120 |
| 3,173,855 | 3/1965 | Miale et al. | 208—120 |

DELBERT E. GANTZ, *Primary Examiner.*

C. R. DAVIS, *Assistant Examiner.*